(12) United States Patent
Kumamoto

(10) Patent No.: US 8,437,727 B2
(45) Date of Patent: May 7, 2013

(54) SIGNAL PROCESSING DEVICE, MOBILE COMMUNICATION TERMINAL DEVICE, AND WIRELESS COMMUNICATION SYSTEM

(75) Inventor: Tetsushi Kumamoto, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 168 days.

(21) Appl. No.: 12/810,824

(22) PCT Filed: Dec. 26, 2008

(86) PCT No.: PCT/JP2008/073768
§ 371 (c)(1),
(2), (4) Date: Sep. 28, 2010

(87) PCT Pub. No.: WO2009/084647
PCT Pub. Date: Jul. 9, 2009

(65) Prior Publication Data
US 2011/0009173 A1  Jan. 13, 2011

(30) Foreign Application Priority Data

Dec. 27, 2007  (JP) ................................. 2007-337088
Jun. 27, 2008  (JP) ................................. 2008-169674

(51) Int. Cl.
*H04B 1/16* (2006.01)
(52) U.S. Cl.
USPC ........................................ 455/343.1; 455/574
(58) Field of Classification Search .... 455/343.1–343.6, 455/127.5, 574
See application file for complete search history.

(56) References Cited

U.S. PATENT DOCUMENTS 7,042,274 B2* 5/2006 Hazucha et al. .............. 327/534
2005/0094036 A1* 5/2005 Tichelaar ................... 455/127.5
2009/0240966 A1* 9/2009 Katoh ........................... 455/574
2009/0284287 A1* 11/2009 Kosuge ......................... 327/365

FOREIGN PATENT DOCUMENTS

| JP | 07-212269 | 8/1995 |
| JP | 08-079165 | 3/1996 |
| JP | 2004-112376 | 4/2004 |
| JP | 2006-211439 | 8/2006 |
| JP | 2007-243317 | 9/2007 |

OTHER PUBLICATIONS

International Search Report for PCT/JP2008/073768, mailed on Mar. 31, 2009, 2 pages.

* cited by examiner

Primary Examiner — Lana N Le
(74) Attorney, Agent, or Firm — Duane Morris LLP

(57) ABSTRACT

A signal processing device such as an RFIC having a function of holding therein control data, enabling stable operation of an integrated circuit because of suspension of power supply during the intermittent reception suspension period in the standby mode, and enabling further improvement of power saving. A portable communication terminal device and a radio communication system are also provided. The signal processing device has an RFIC unit (12) and an ASIC unit (13) connected to the RFIC unit (12) via an input/output buffer circuit (140), making control such that power supply to the RFIC unit (12) is suspended during the reception suspension period during which signaling information is not received in the standby mode and power is supplied to the RFIC unit (12) when signaling information is received, and including an SPI therein. The ASIC unit (13) makes a control simultaneously with suspension of the power supply to the input/output buffer circuit (140), fetches a register value from a control register (34) before the power supply to the RFIC unit (12) is suspended, holds the register value in the SPI, and transfers the held register valued to the RFIC unit (12) and the control register (34) when the power supply is restarted.

8 Claims, 7 Drawing Sheets

100

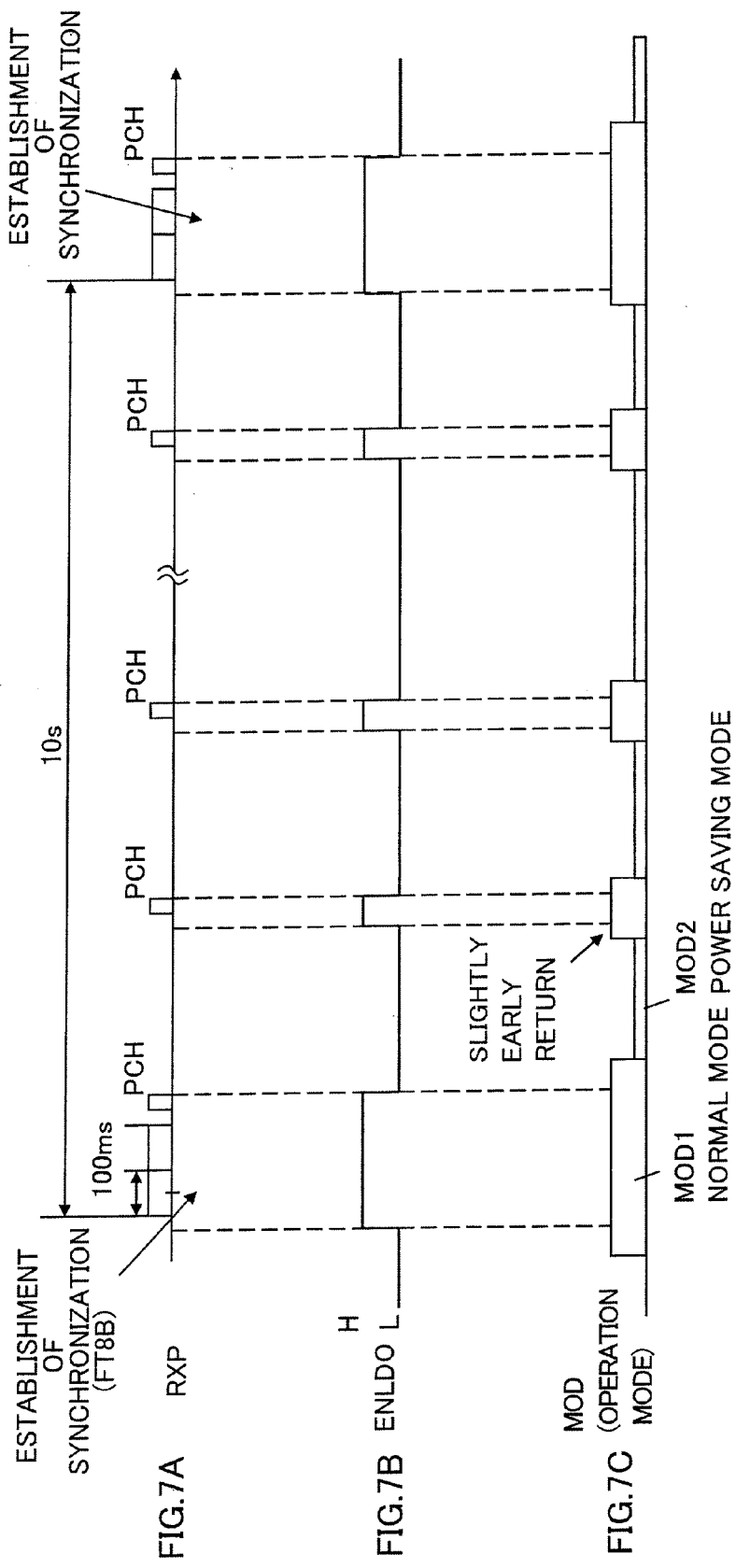

SIGNAL PROCESSING DEVICE, MOBILE COMMUNICATION TERMINAL DEVICE, AND WIRELESS COMMUNICATION SYSTEM

CROSS-REFERENCE TO RELATED APPLICATIONS

This is a U.S. National Phase Application of International Application No. PCT/JP2008/073768 filed Dec. 26, 2008, which claims priority to Japanese Patent Application No. 2007-337088 filed Dec. 27, 2007 and Japanese Patent Application No. 2008-169674 filed Jun. 27, 2008, the disclosures of which are incorporated herein by reference in their entirety.

TECHNICAL FIELD

The present invention relates to, for example, a signal processing device which is suitably used for a product having, as a system component, an RFIC (radio frequency IC) or other integrated circuit holding control data inside it and stopped being fed power while in a stopped state in intermittent reception in a standby mode and to a mobile communication terminal device and a wireless communication system of the same.

BACKGROUND ART

A mobile phone or other mobile communication terminal device uses a standby mode or shutdown mode of an LSI provided by a vender when signaling information is not received while waiting so as to try to save power of the system (see for example Patent Document 1).

Further, the practice has been to not shut off the power to parts holding control data related to system control, but to use them in a state supplied with power at all times, and to stop the supply of power to only parts which do not have to hold data so as to thereby try to save power.

Up until now, this has not been necessary because of individual parts (ICs) were used. However, the trend is for combining ICs for greater integration of circuits. The reason for this is that the increasing small size of mobile phones has made it essential to save power and decrease the number of parts.

Further, as an analog high frequency circuit receiving and modulating/demodulating signals in a mobile phone, an RFIC is used.

For this RFIC as well, if not receiving signaling information when waiting, the supply of power to the RFIC is stopped so as to try to save power—but only in a case of use of an IC of an RF block of a type not holding control data inside it.

Patent Document 1: Japanese Patent Publication (A) No. 2006-211439

DISCLOSURE OF THE INVENTION

Technical Problem

In general, however, when using an RFIC of the type of holding the control data inside it, a mobile communication terminal device does not perform processing for suspending the supply of power to the RFIC.

For this type of RFIC as well, system-wise, desirably the supply of power is stopped to reduce the wasted current as much as possible so as to try to save power.

However, if a mobile communication terminal device suspends the supply of power to the RFIC, the problem arises that all control data will end up being lost, so when again supplying power to the RFIC at the time of the reception of signaling information in the standby mode, the control data cannot be returned to the state before the suspension of the supply of power.

For this reason, it may be considered to add a nonvolatile memory or other memory for backup inside or outside of the RFIC and to fetch a register value from a control register of the RFIC and hold it in the added non-volatile memory or other memory under the control of a CPU on the main body side before suspending the supply of power to the RFIC.

In this case, when restarting the supply of power to the RFIC, the mobile communication terminal device transfers the register value held in the nonvolatile memory or other memory to the control register of the RFIC.

However, when the supply of power is suspended, elements of the RFIC may be damaged resulting in deterioration or shortening of the service lives of the parts. Sometimes, the RFIC will even be destroyed.

Further, even on the main body side which remains powered for managing the system, the operation may be destabilized due to irregular data fetched from the RFIC or a larger current may be consumed than with fixed data due to fluctuation of the signal.

The present invention provides a signal processing device capable of stabilizing the operation of an RFIC or other integrated circuit having the function of holding control data inside it and stopped being fed power while in a stopped state in intermittent reception in a standby mode and thereby capable of further saving power and provides a mobile communication terminal device and a wireless communication system of the same.

Technical Solution

A signal processing device of a first aspect of the present invention has a first integrated circuit generating a power source control signal for controlling an ON and OFF state of a power source, a second integrated circuit turned on and off in power by the power source control signal generated by the first integrated circuit, and an input/output buffer circuit arranged between the first integrated circuit and the second integrated circuit for performing input/output, wherein the first integrated circuit controls the state of input or output of the input/output buffer circuit linked with the power source control signal.

Preferably, the second integrated circuit has at least a storage circuit.

Preferably, the first integrated circuit fetches storage content from the storage circuit provided in the second integrated circuit and holds the storage content inside the first integrated circuit before turning off the power source of the second integrated circuit by the power source control signal and transfers the held storage content to the storage circuit of the second integrated circuit when switching the power source of the second integrated circuit on by the power source control signal.

Preferably, the first integrated circuit sets the output with respect to the input/output buffer circuit in a floating state linked with the power source control signal turning the power source of the second integrated circuit off.

Preferably, the first integrated circuit has a switch for fixing the input/output buffer circuit to either a pullup or pulldown mode linked with the power source control signal turning the power source of the second integrated circuit off when the input to the first input/output buffer circuit is an undefined level.

Preferably, the first integrated circuit sets the output level of the input/output buffer circuit at a low level linked with the power source control signal turning the power source of the second integrated circuit off when the power source control signal is at a low level.

Preferably, the first integrated circuit switches the output of the input/output buffer circuit to input linked with the power source control signal turning the power source of the second integrated circuit off.

A mobile communication terminal device of a second aspect of the present invention has a high frequency circuit part including a control register and has a control circuit part which is connected through an input/output buffer circuit to the high frequency circuit part and which performs control so as to suspend the supply of power to the high frequency circuit part in a reception suspension period when signaling information is not received in a standby state and to supply power to the high frequency circuit part at the time of the reception of signaling information, wherein the control circuit part controls the input/output buffer circuit linked with the suspension of the supply of power, fetches a register value from the control register of the high frequency circuit part, holds the content of the control register set in the high frequency circuit part before suspending the supply of power to the high frequency circuit part, and transfers the held register value to the control register of the high frequency circuit part when restarting the supply of power to the high frequency part.

A communication system of a third aspect of the present invention has a mobile communication terminal device and a base station, wherein the mobile communication terminal device includes a high frequency circuit part including a control register and wirelessly communicating with the base station, a control circuit part which is connected to the high frequency circuit part through an input/output buffer circuit and performs controls so as to suspend the supply of power to the high frequency circuit part in a reception suspension period when signaling information is not received in a wireless communication standby state with the base station and to supply power to the high frequency circuit part at the time of reception of the signaling information, and a control part, the control part has a timer function of acquiring information concerning reception timing of following signaling information at the time of establishment of synchronization with the base station and measuring the reception timing, the control circuit part has a power saving mode of suspending operation or performing operation by a low frequency, the control part sets the control circuit part to the power saving mode in the standby mode of the signaling information from the base station and releases the power saving mode when detecting by the timer function that the reception timing is approaching, and the control circuit part controls the input/output buffer circuit linked with the suspension of the supply of power, fetches a register value from the control register of the high frequency circuit part, holds the control register content set in the high frequency circuit part before suspending the supply of power to the high frequency circuit part, and transfers the held register value to the control register of the high frequency circuit part when restarting the supply of power to the high frequency part.

Advantageous Effects

According to the present invention, the signal processing device has the function of holding control data of an RFIC etc. inside it and can stabilize the operation of the integrated circuit stopped being fed power while in a stopped state in intermittent reception in a standby mode, so can further save power.

BRIEF DESCRIPTION OF DRAWINGS

FIG. 7A to FIG. 7C are sequence diagrams for explaining an example of the operation at the time of intermittent reception of the mobile phone.

EXPLANATION OF REFERENCES

1 . . . mobile phone, 11 . . . antenna, 12 . . . RFIC part, 13 . . . ASIC part, 14 . . . baseband part, 15 . . . CPU, 16 . . . SPI control part, 31 . . . RF control part, 32 . . . 4-channel ADC, 33 . . . PLL DAC, 34 . . . control register, 161 . . . register group, REG0 to REG3 . . . registers, 121, 122 . . . switches, 131 . . . BB block, 132 . . . RX block, 133 . . . TX block, 134 . . . serial interface block, 135 . . . TPU block, 136 . . . GPIO block, 137 . . . common bus, 138 . . . CPU interface, 140 . . . input/output buffer circuit (I/O BUF), 141 . . . multiplexer (MUX), 142 . . . AND gate, 2 . . . base station, and 100 . . . wireless communication system.

BEST MODE FOR CARRYING OUT THE INVENTION

Below, an embodiment of the present invention will be explained with reference to the drawings.

Figure 1:
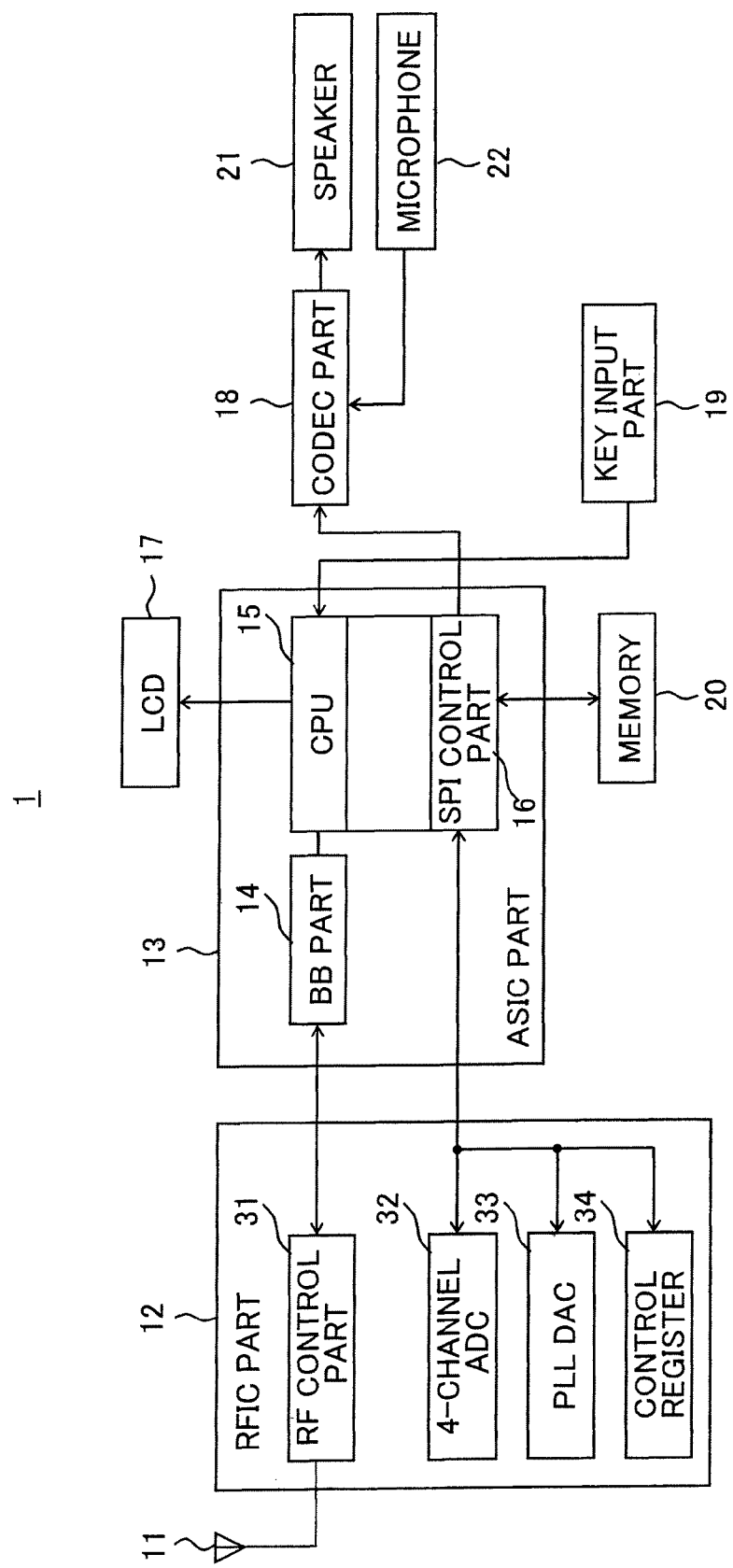
FIG. 1 is a block diagram showing an example of the configuration of a signal processing system of a mobile communication terminal device according to an embodiment of the present invention.

FIG. 1 is a block diagram showing an example of the configuration of a signal processing system of a mobile communication terminal device according to an embodiment of the present invention. Here, a mobile phone 1 is illustrated as the mobile communication terminal device.

The mobile phone 1, as shown in FIG. 1, has an RFIC part 12 performing transmission/reception of signals with the mobile phone of another party through an antenna 11 and an ASIC part 13 processing signals transmitted and received at the RFIC part 12.

The ASIC part 13 has a baseband part (BB) 14 performing modulation/demodulation of signals, a CPU 15 as a control part, and an SPI (serial parallel interface) control part 16 outputting control data required for transmission/reception of the RFIC part 12.

Further, the RFIC part 12 has an RF control part 31, a 4-channel analog digital converter (ADC) 32, a PLL (phase locked loop) digital analog converter (PLL DAC) 33, and control register 34 holding the control data output from the SPI control part 16 when the power is on.

The mobile phone 1 shown in FIG. 1 further has a liquid crystal display part (LCD) 17, a codec part 18 performing A/D and D/A conversions of an audio signal, a key input part 19 giving input information from a user to the CPU 15, a memory 20 storing programs, a speaker 21, and a microphone 22.

For interface between the control register 34 of the RFIC part 12 and the ASIC part 13, an SPI is used. Further, for the 4-channel analog digital converter 32 and the PLL digital analog converter 33 as well, an SPI is used for the interface.

As the interface, a parallel interface is good. However, when the transfer rate is small, an SPI is effective and is advantageous in package size as well, therefore an SPI is used here.

The CPU 15 performs control so as to suspend the supply of power to the RFIC part 12 at the time when signaling information is not received in the standby mode (stopped state in intermittent reception) and to supply power to the RFIC part 12 at the time when signaling information is received in the standby mode (receiving state in intermittent reception).

The CPU 15 sends all values of the control register 34 through the SPI into the ASIC part 13 before turning off the power source of the RFIC part 12 and, at the time of return, executes automatic transfer by automatic resetting or by a CPU command so as to maintain the state before standby.

Due to this, the CPU 15 can behave as if it had been holding the control data.

A concrete example of the control by the CPU 15 will be explained in detail later.

Figure 2:
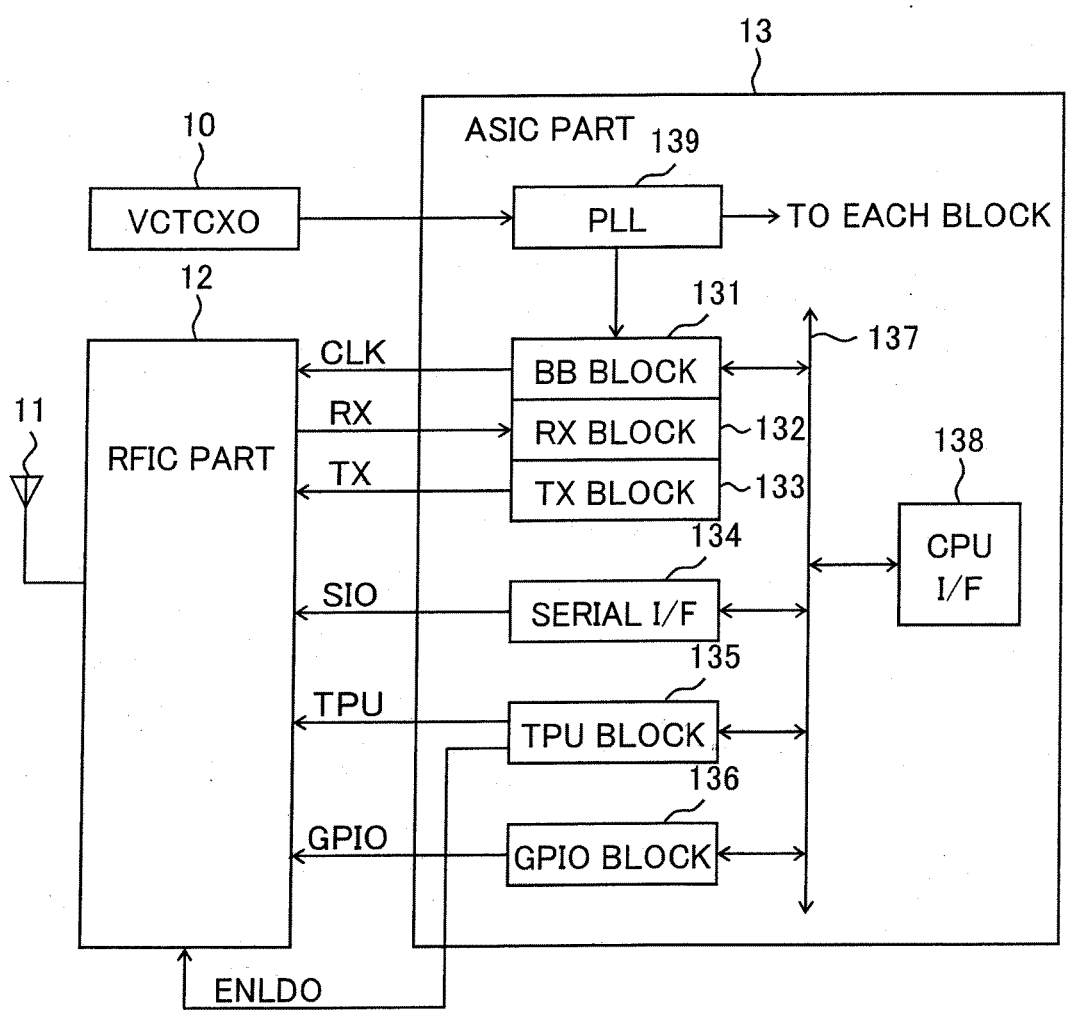
FIG. 2 is a diagram showing an example of the configuration of external connections of an RFIC part and an ASIC part shown in FIG. 1.

FIG. 2 is a diagram showing an example of the configuration of external connections of the RFIC part 12 and the ASIC part 13 shown in FIG. 1.

As shown in FIG. 2, for the communication between the RFIC part 12 and the ASIC part 13, use is made of a clock signal CLK, data reception signal RX, data transmission signal TX, timing processor unit signal TPU, serial I/O signal SIO, and general purpose I/O signal GPIO.

The ASIC part 13 shown in FIG. 2 is shown extracting only the connection portion with the RFIC part 12.

The ASIC part 13 of FIG. 2 is configured by a baseband block (BB) 131, RX block 132, TX block 133, serial interface (I/F) block 134, TPU block 135, and GPIO block 136 connected through a common bus 137 to a CPU interface (I/F) 138.

The blocks 131, 132, 133, 134, 135, and 136 described above respectively perform transmission/reception with the RFIC part 12 of the clock signal CLK, data reception signal RX, data transmission signal TX, timing processor unit signal, serial I/O signal SIO, and general purpose input/output signal GPIO.

Note that, each block of the digital part described above is supplied with a clock signal CLK through the PLL 139 from a quartz oscillator (VCTCXO) 10.

Note that, under control of the CPU 15, the TPU block 135 acquires information indicating whether the state is the standby mode from the BB block 131 and controls the power of the RFIC part 12 so as to suspend the supply of power to the RFIC part 12 at the stopped state in intermittent reception and to supply power at the time of reception by generating a wakeup signal SWUP.

FIG. 3A and FIG. 3B and FIG. 4A and FIG. 4B are diagrams showing examples of the circuit configuration of a signal processing device according to embodiments of the present invention.

Here, examples where the signal processing device is used as an interface between the control register 34 of the RFIC part 12 and the ASIC part 13 are shown.

Note that, it is also possible to achieve the same configuration between the 4-channel analog digital converter 32 and the PLL digital analog converter 33.

Both signal processing devices have configurations enhanced interface-wise in order to avoid influence exerted on the two when the supply of power to the RFIC part 12 is turned off under the control of the ASIC part 13, for example, damage of circuit parts (deterioration or breakage) given to the RFIC part 12 and unstable operation of the ASIC part 13.

Figure 3A:
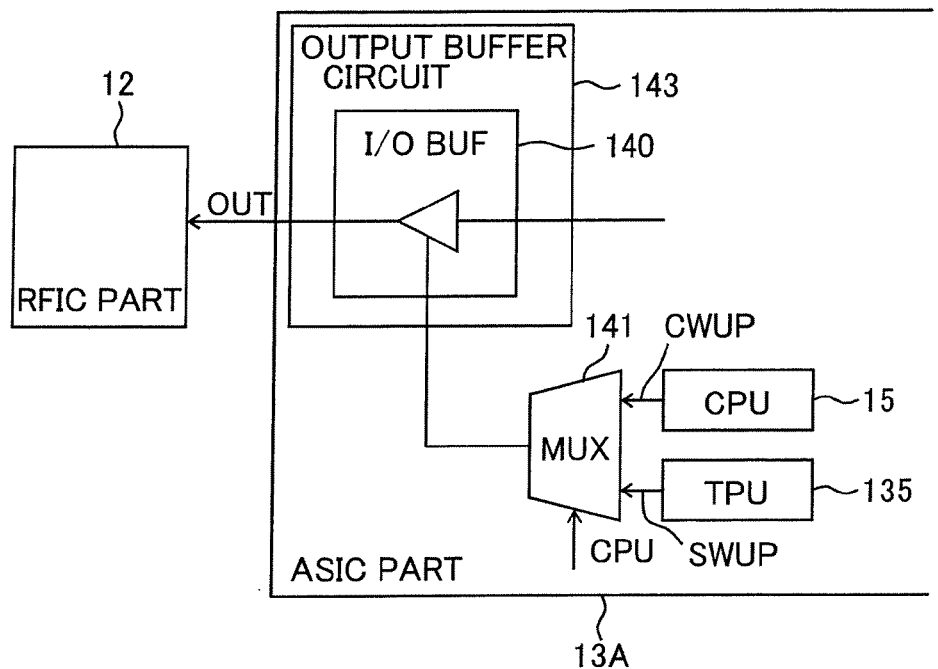
FIG. 3A and FIG. 3B are diagrams showing circuit configurations of the periphery of an input/output buffer circuit of the signal processing device according to an embodiment of the present invention.

According to the circuit configuration shown in FIG. 3A, an ASIC part 13A sets the output of the RFIC part 12, specifically, the output with respect to the input/output buffer circuit (I/O BUF) 140, in the floating state linked with the off state of the power source of the RFIC part 12.

Here, the input/output buffer circuit 140 is supplied with a wakeup command CWUP from the CPU 15 or a wakeup signal SWUP generated by a TPU block 175 through a multiplexer (MUX) 141.

The ASIC part 13 controls the input/output buffer circuit 140 using either one of these as a power source ON/OFF control signal (ENLDO) to thereby set the output to the input/output buffer circuit 140 in a high impedance state (floating).

Note that, the TPU block 135 acquires information of whether the mobile phone 1 is in the standby mode from the BB block 131 and unambiguously generates the above wakeup signal SWUP when the supply of power to the RFIC part 12 is started at the receiving state in intermittent reception.

Due to this, damage given to the RFIC part 12 when the supply of power to the RFIC part 12 is interrupted can be avoided.

On the other hand, for the input of the RFIC part 12, that is, the output of the input/output buffer circuit 140, from the viewpoint of reduction of power consumption, it has been requested to set it in a state not the floating state.

Figure 3B:
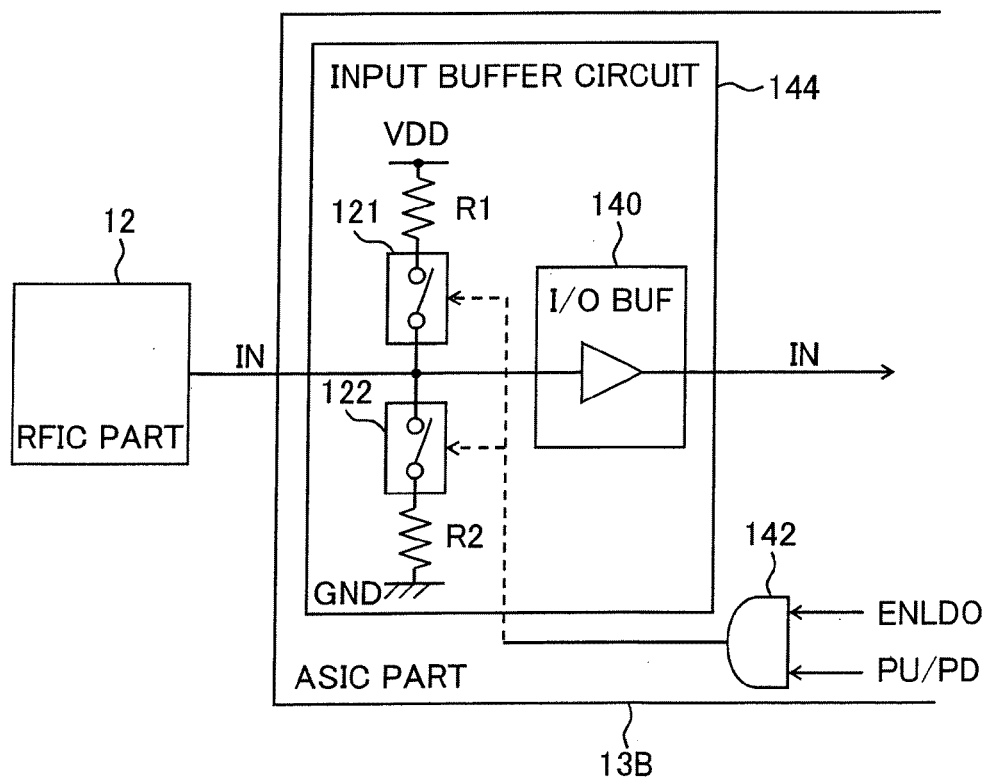

For this reason, according to the circuit configuration shown in FIG. 3B, an ASIC part 13B has switches 121 and 122 for fixing the input/output buffer circuit 140 to either of the pullup or pulldown mode when the input to the input/output buffer circuit is unstable.

Both of the above switches 121 and 122 are controlled, under the control by the CPU 15 of the ASIC part 13B, by AND logic by an AND gate 142 between the power source ON/OFF control signal ENLDO and a signal designating whether the pullup/down signal PU/PD is PU or PD.

Due to this, the input to the input/output buffer circuit 145 is pulled up or pulled down by resistors R1 and R2, therefore the signal at a decided level begins to be input.

Accordingly, the ASIC part 13B can avoid malfunction due to the input of a signal of an undefined level from the RFIC part 12.

Figure 4A:
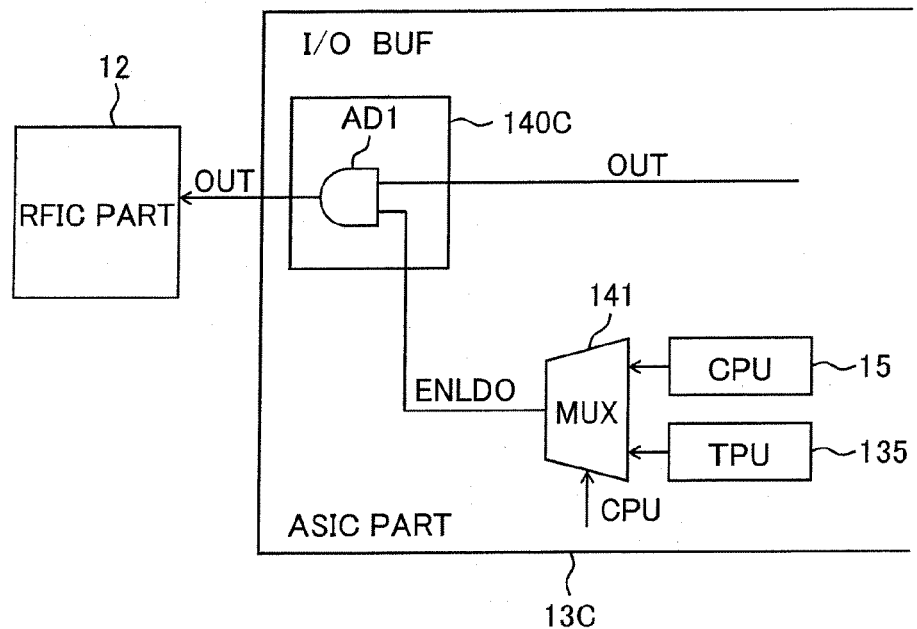
FIG. 4A and FIG. 4B are diagrams showing circuit configurations of the periphery of the input/output buffer circuit of the signal processing device according to another embodiment of the present invention.
Figure 4B:
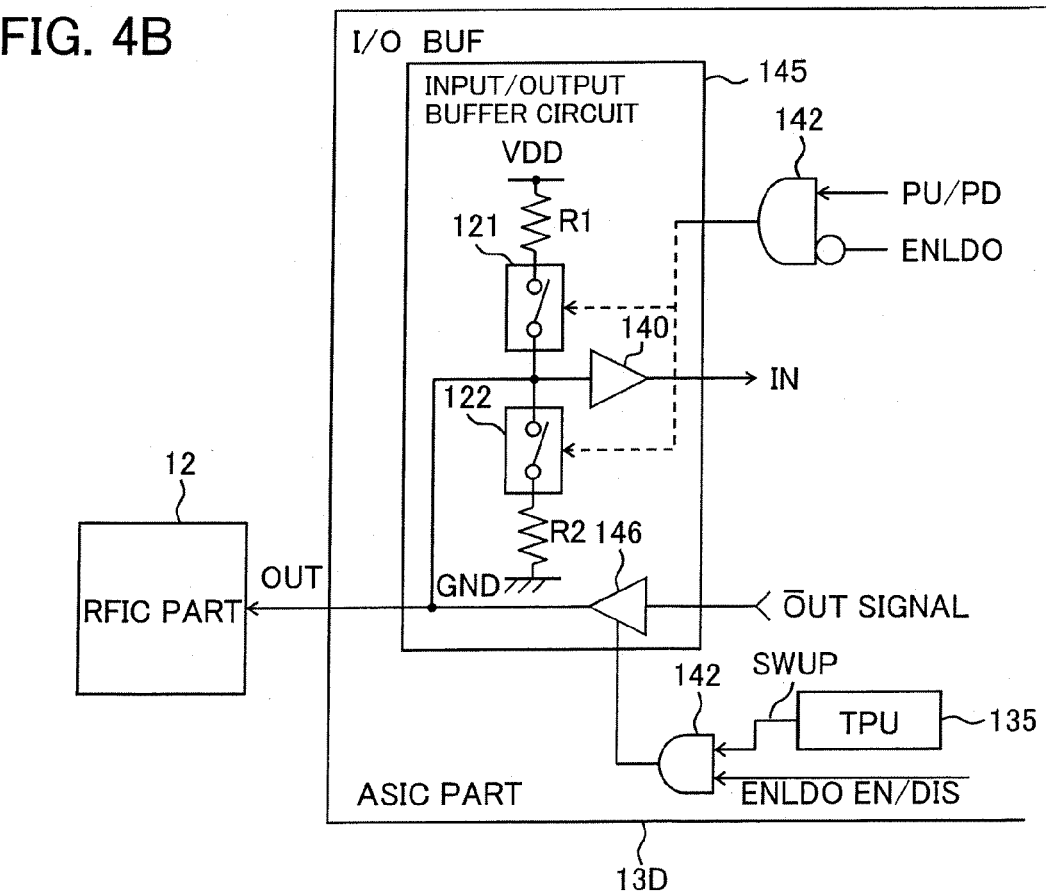

FIG. 4A and FIG. 4B are diagrams showing an example of an alternative circuit configuration to FIG. 3A.

There is a configuration achieving a high level output state in a state where nothing is done by pullup or the like. In this case, however, by setting the level to the floating state or low level or switching to input, damage given to the RFIC part 12 can be avoided.

For example, as shown in the circuit configuration shown in FIG. 4A, an ASIC part 13C may link the level of the output signal of the RFIC part 12 with the off state of the power source of the RFIC part 12 and set the system so that the output OUT becomes a low level when the power source ON/OFF control signal ENLDO is the low level.

In the example of FIG. 4A, an AND gate AD1 is arranged in an input/output buffer circuit 140C.

Further, according to the circuit configuration shown in FIG. 4B, an ASIC part 13D switches the output of the input/output buffer circuit 145 to input linked with the off state of the power source of the RFIC part 12.

The signal is normally the output, but control is performed so that it switches to the input signal linked with this power source ON/OFF control signal ENLDO at the time when the power source ON/OFF control signal ENLDO is low in level.

In this case, the output buffer 146 of the input/output buffer circuit 145 is controlled by the wakeup signal SWUP generated by the TPU block 135 and an enable/disable signal ENLDO EN/DIS of the power source ON/OFF control signal ENLDO supplied by the CPU 15.

Namely, when the RFIC part 12 is an active low level, it is possible to switch the input and output in order to avoid damage of the RFIC part 12.

As explained above, when the supply of power of the RFIC part 12 is turned off at the ASIC part 13 side, power is supplied at the ASIC part 13 side at all times, therefore the RFIC part 12 might supposedly suffer deterioration, breakage, or other damage of circuit parts or input of an unstable state at the ASIC part 13 side. However, according to the signal processing device according to the embodiment of the present invention, these can be avoided.

Namely, according to the signal processing device of the present embodiment, the output signal of the RFIC part 12 is set in the floating state so the RFIC part 12 is not damaged and excess current does not flow. Further, regarding the input signal of the RFIC part 12, there is no dependency on fluctuation of the signal level of the RFIC part 12 side, therefore malfunctions due to an undefined signal input at the ASIC part 13 side can be avoided.

Figure 5:
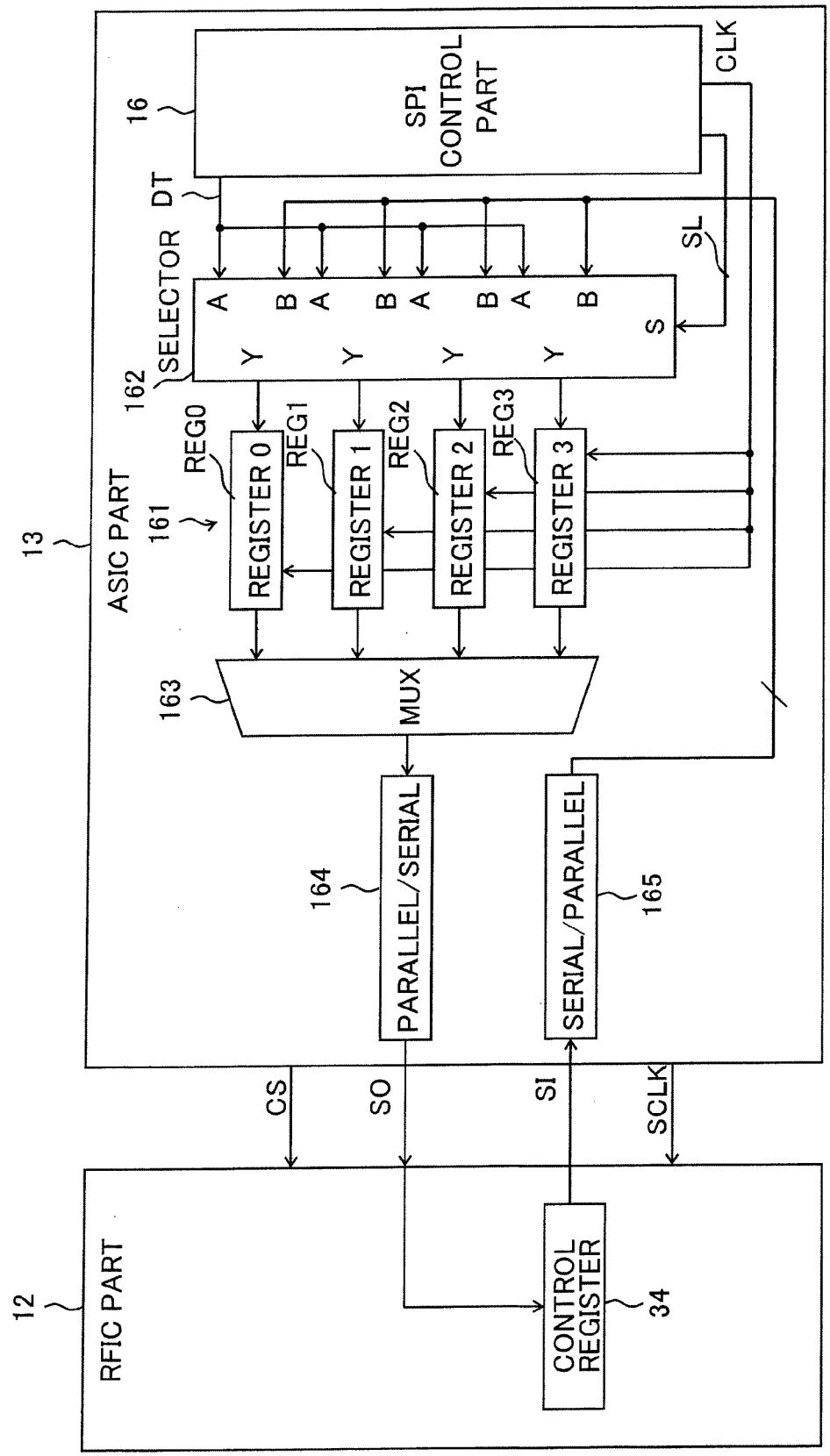
FIG. 5 is a diagram showing an example of the circuit configuration of the periphery of an SPI control part in the example of the configuration of the external connection of the RFIC part and the ASIC part shown in FIG. 2.

FIG. 5 is a diagram showing the circuit configuration of the periphery of the SPI control part 16 in the configuration diagram of external connections of the RFIC part 12 and the ASIC part 13 shown in FIG. 2.

As shown in FIG. 5, the ASIC part 13 has a register group 161, selector 162, multiplexer 163, parallel/serial conversion part 164, and serial/parallel conversion part 165 related to the SPI control part 16.

The register group 161 has a plurality of (four in FIG. 5) registers REG0 to REG3 holding the control data.

These registers REG0 to REG3 perform holding operations of the control data selected at the selector 162 in synchronization with the clock signal CLK supplied from the SPI control part 16.

The selector 162 selects either of the data DT by the SPI control part 16 or the value of the control register 34 of the RFIC part 12 passed through the serial/parallel conversion part 165 in response to a select signal SL and outputs this to the corresponding registers REG0 to REG3.

The selector 162 has a plurality of (four sets here) input parts configured by pairs of inputs A and B corresponding to the number of registers of the register group 161.

The data DT of the SPI control part 16 is supplied to each input A of the selector 162, and the value of the control register 34 of the RFIC part 12 converted to a parallel signal at the serial/parallel conversion part 165 is supplied to each input B.

The multiplexer 163, under the control of for example the CPU 15, selects the held data of the registers REG0 to REG3 and outputs the selected data to the parallel/serial conversion part 164.

The parallel/serial conversion part 164 converts the held data of the registers REG0 to REG3 from the multiplexer 163 to serial signals and outputs these as serial output signals SO to the control register 34 of the RFIC part 12.

The serial/parallel conversion part 165 converts the serial input signals SI transferred from the control register 34 of the RFIC part 12 to parallel signals and supplies the converted data to the plurality of inputs B side of the selector 162.

In such a configuration, when the control data which was stored in the control register 34 is lost due to the suspension of the supply of power to the RFIC part 12, the supply of power to the RFIC part 12 is started at the receiving state in intermittent reception.

When the supply of power to the RFIC part 12 is started, in the ASIC part 13, the control data stored in the registers REG0 to REG3 inside the ASIC part 13 is selected by the multiplexer 163 by the wakeup signal SWUP generated by the TPU block 135 or the wakeup command CWUP generated by the CPU 15.

Then, the selected control data is converted at the parallel/serial conversion part 164 to the serial output signal SO which is then transferred to the RFIC part 12. The transferred control data is stored in the control register 34.

Package transfer is executed in this way.

Note that, for the communication between the RFIC part 12 and the ASIC part 13, use is made of a chip select signal CS or clock signal SCLK.

FIG. 5 shows an example where the control register 34 in the RFIC part 12 uses the chip select signal CS and clock signal SCLK to store the serial data input signal SI in the ASIC part 13 before turning off the power source.

Further, FIG. 5 shows, as an example, a case where the data transferred from the RFIC part 12 is converted to parallel data at the serial/parallel conversion part 165 and stored in the registers REG0 to REG3 when the selector 162 controlled by the SPI control part 16 or CPU 15 selects input to the RFIC part 12 as the transfer state.

Note that, when the supply of power to the RFIC part 12 is started, package transfer of the control data stored in the registers REG0 to REG3 is executed.

Note, this transfer does not even require 1 millisecond, therefore this transfer time does not influence other processing.

For example, in a CPU 15 using a 24M clock, if 41.6 nsec per bit is required for the transfer, 41.6 nsec×8×4=1.33 μsec are required for the four 8-bit configuration registers REG0 to REG3 built-in the ASIC part 13. If the processing time of the CPU 15 is 2 μsec, 3.33 μsec are required in total.

Below, an example of the operation of the mobile phone 1 at the time of intermittent reception will be explained.

Figure 6A:
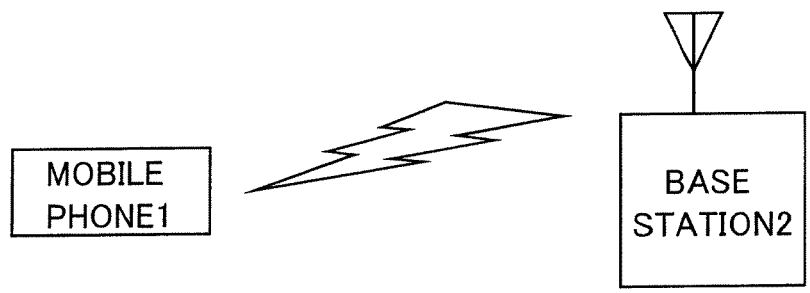
FIG. 6A and FIG. 6B are conceptual views of a wireless communication system including a mobile phone and a base station.
Figure 6B:
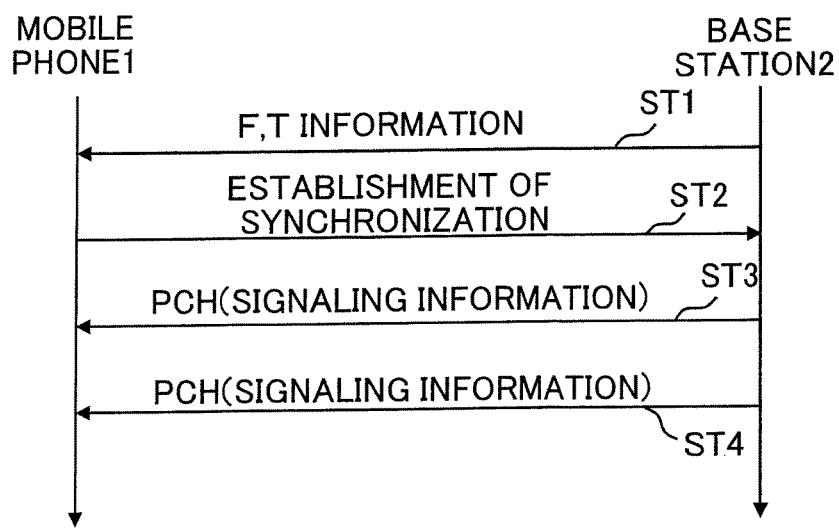

FIG. 6A and FIG. 6B are conceptual views of a wireless communication system 100 including the mobile phone 1 and the base station 2.

As shown in FIG. 6A, the mobile phone 1 and the base station 2 perform wireless communication.

The wireless communication system 100 shown in FIG. 6A is for example an iBurst® system and performs wireless communication in a sequence as shown in FIG. 6B.

FIG. 6B is a diagram showing an example of the sequence at the time of communication between the mobile phone 1 and the base station 2.

As shown in FIG. 6B, first, frequency (F) and timing (T) information (FT information) for performing wireless communication are transmitted from the base station 2 to the mobile phone 1 (ST1).

The mobile phone acquiring the FT information establishes synchronization with the base station 2 (ST3).

After establishing synchronization, the mobile phone 1 receives PCH (paging channel: signaling information) transmitted by the base station 2 to communicate. For example, it selects the base station 2 with the strongest signal to communicate (ST3, ST4).

The signaling information PCH is transmitted from the base station 2 in a predetermined cycle, for example, a cycle for every 2.56 seconds or every 5.12 seconds.

The mobile phone 1 waits for the signaling information PCH and performs reception processing only at the time when the signaling information PCH is sent. Specifically, it turns the power source of the RFIC part 12 on.

This is referred to as "intermittent reception" in the present embodiment.

FIG. 7A to FIG. 7C are sequence views for explaining an example of the operation of the mobile phone 1 in the intermittent reception period.

FIG. 7A shows a reception position RXP, FIG. 7B shows the power source ON/OFF control signal ENLDO, and FIG. 7C shows an operation mode MOD of the ASIC part 13.

Note that, the operation mode MOD of the ASIC part 13 includes a normal mode MOD1 and a power saving mode MOD2.

As explained above, the CPU 15 performs control so as to suspend the supply of power to the RFIC part 12 at the time when the signaling information signal is not received in the standby mode (stopped state in intermittent reception) and to supply power to the RFIC part 12 when receiving signaling information in the standby mode (receiving state in intermittent reception).

Namely, the CPU 15 obtains the information of the timing for transmission of the signaling information from the base station 2 by communicating with the base station 2 in advance.

That is, at the portion FT8B in FIG. 7, specifically at the portion for communication including the frequency and timing information and communication for establishing synchronization between the mobile phone 1 and the base station 2, the mobile phone 1 communicates with the base station 2 and acquires information indicating at which timing the signaling information PCH is transmitted.

The timing of transmission of the signaling information PCH is determined in advance on the base station 2 side. The position indicated by PCH of the reception position RXP shown in FIG. 7A is the timing of the transmission of the signaling information PCH.

The CPU 15 manages the return time by a timer or the like so as to return the RFIC part 12 from the standby state matching with that timing.

Note that, a series of communication including a predetermined number of times of transmission of signaling information from the communication (FT8B) for establishing synchronization between the mobile phone 1 and the base station 2 is set to be repeated by a predetermined cycle. FIG. 7 shows a case where this cycle is for example 10 seconds as an example.

Namely, as shown in FIG. 7A to FIG. 7C, the CPU 15 transmits the power source ON/OFF control signal ENLDO in advance and controls the power source of the RFIC part 12 matching with the planned reception position of the signaling information PCH. Due to this, intermittent reception in the mobile phone 1 is realized.

In addition, the ASIC part 13 including the CPU 15 may have several operation modes as well. As explained before, the ASIC part 13 has the normal mode MOD1 and power saving mode MOD2. Further, for example, it is also possible to include, as the power saving mode MOD2, a clock complete suspension mode MOD21, clock 32K operation mode MOD22, partial clock suspension mode MOD23, and so on.

Namely, these are modes enabling the ASIC part 13 to operate matching with the timing of reception of the signaling information from the base station 2 acquired in advance.

The clock complete suspension mode MOD21 is for example a mode in which the operation of the ASIC part 13 is completely suspended until interruption by the timer.

The clock 32K mode MOD22 is a mode in which the ASIC part 13 is operated at a low frequency of 32 kHz until interruption by the timer.

The partial clock suspension mode MOD23 is a mode in which the ASIC part 13 is operated by dividing each component thereof into a block operated by supplying a high speed clock and a block for which the clock is suspended. This mode is continued until interruption by the timer as well.

From the three modes MOD21 to MOD23 explained above, the ASIC part 13 returns to the normal mode in response to an interruption signal from the timer of the CPU 15.

The normal mode MOD1 is the mode for the normal operation performing the operation explained above.

Namely, as shown in FIG. 7A to FIG. 7C, the CPU 15 suitably changes the operation mode of the ASIC part 13 matching with the transmission timing of the signaling information PCH from the base station 2 acquired in advance and returns to the normal operation mode when learning by the interruption signal from the timer that the transmission timing of the signaling information is approaching.

Modes other than the normal mode of the ASIC part 13 changed by the CPU 15 includes modes in which operation with less power is possible, for example, operation completely suspended or partially suspended or operation at a low frequency.

Namely, the ASIC part 13 intermittently operates and the power source ON/OFF control signal ENLDO is transmitted linked with the ASIC part 13, therefore the RFIC part 12 performs intermittent operation matching with the transmission timing of the signaling information from the base station 2.

Due to this, the power is saved in the standby mode in the mobile phone 1. That is, the three modes explained above can be called the "power saving modes" of the ASIC part 13.

Note that, it is possible to have the CPU 15 operate together with the ASIC part 13 in the power saving mode MOD2 explained above or have only the CPU 15 normally operate all the time.

Further, the ASIC part 13 is preferably returned from the power saving mode MOD2 to the normal mode by the CPU 15 a little bit earlier (for example 5 ms before) the transmission timing of the signaling information.

This is to enable the CPU 15 to control all of the operations. Returning the ASIC part 13 slightly earlier than the transmission timing of the signaling information smoothes the return of the RFIC part 12 after that.

As explained above, the signal processing device according to the embodiment of the present invention has, for example, in FIG. 3, a first integrated circuit (ASIC part 13), a second integrated circuit (RFIC part 12) turned ON/OFF in power by the power source control signal (ENLDO) generated by the first integrated circuit (ASIC part 13), and an input/output buffer circuit 140 provided between the first and second integrated circuits (ASIC part 13 and RFIC part 12).

Further, the signal processing device is configured so that the first integrated circuit (ASIC part 13) controls the input/output buffer circuit 140 linked with the power source control signal (ENLDO).

In this way, by adding a small amount of hardware configured by the input/output buffer circuit 140 and its peripheral logic circuits, for example, the components of the RFIC part 12 will not suffer deterioration, breakage, or other damage and the ASIC part 13 with the power kept ON in order to perform system management will no longer obtain undefined data from the RFIC part 12, therefore malfunctions can be avoided.

Further, after acquisition of the power source control signal generated by software by the CPU 15 or by hardware by the TPU block 135, the control is carried out by the small amount of hardware described above. Therefore, this does not apply a load upon the software (CPU 15) and can contribute to the reduction of power consumption as a measure against wasted current.

Note that, according to the signal processing device according to the embodiment of the present invention described above, the RFIC was illustrated at the side where the supply of power was suspended, but the invention is not limited to an RFIC. It may be replaced with any IC having a built-in memory holding data in it.

Further, the mobile phone 1 of the present embodiment wirelessly communicates with the base station 2 and obtains in advance the timing of transmission, from the base station, of the signaling information (PCH: paging channel) in the communication standby state after establishment of synchronization as information from the base station 2. The CPU 15 changes the operation mode of the ASIC part 13 by the timer function matching with this timing.

Specifically, in the signaling information standby state, the CPU 15 changes the operation mode to the clock complete suspension mode, clock 32K mode, partial clock suspension mode, or other mode for saving power by suspending or restricting the operation of the ASIC part 13. Then, the CPU 15 returns the operation of the ASIC part 13 from the power saving mode to the normal mode of performing the normal operation in response to interruption by the timer.

The returned ASIC part 13 controls the power source to turn on by the power source ON/OFF control signal ENLDO of the RFIC part 12.

Accordingly, in the mobile phone 1 of the present embodiment, in the signaling information standby mode from the base station 2, the ASIC part 13 is returned from the power saving mode and the power source of the RFIC part 12 is controlled to turn on matching with the signaling information transmission timing from the base station 2, therefore much power can be saved in the standby mode.

Further, in the mobile communication terminal device according to the embodiment of the present invention, for example, in FIG. 1 to FIG. 5, a high frequency circuit part (RFIC part 12) having the built-in control register 34 and a high frequency circuit part (RFIC part 12) are connected through an input/output buffer circuit (140 of FIG. 3).

The mobile communication terminal device has a control circuit part (ASIC part 13) which performs controls so as to suspend the supply of power to the high frequency part (RFIC part 12) in the reception suspension period when the signaling information is not received in the standby mode and supply power to the high frequency circuit part at the time of reception of the signaling information. It has a serial/parallel interface (registers REG0 to REG3 of FIG. 5) inside it.

The control circuit part (ASIC part 13) controls the input/output buffer circuit (indicated by reference numeral 140 in FIG. 3) linked with the suspension of the supply of power. It fetches the register value from the control register 34 of the high frequency circuit part (RFIC part 12) and holds it in the serial parallel interface (registers REG0 to REG3 of FIG. 5) when suspending the supply of power to the high frequency circuit part (RFIC part 12).

The control circuit part (ASIC part 13) is configured so as to transfer the register value held in the serial parallel interface (registers REG0 to REG3 in FIG. 5) to the control register 34 of the high frequency circuit part (RFIC part 12) when restarting the supply of power to the high frequency circuit part (RFIC part 12).

According to the mobile communication terminal device according to the embodiment of the present invention, it is possible to stabilize the operation of, for example, an RFIC or other integrated circuit of the type having the function of holding control data inside it and suspended being fed power in the suspended state in intermittent reception in the standby mode and to contribute to the improvement of the reliability of the mobile communication terminal device and further save on power.

Note that, if supplementing the explanation on the restrictions in mounting, contrary to the trend toward integration by combination of ICs, it is difficult to electrically combine the above first integrated circuit (ASIC part 13) and second integrated circuit (RFIC part 12).

Namely, from the viewpoint of the semiconductor fabrication process, when forming the above functional circuits on one semiconductor wafer, it becomes difficult to separately control the supply of the power. That is, when power is supplied to one, the power is propagated on the semiconductor wafer, so turning on the power affects the other integrated circuit as well.

Note that, it is possible to mount the first integrated circuit and second integrated circuit in one package so as to form what appears to be a single integrated circuit, but it is necessary to separately manufacture the first integrated circuit and the second integrated circuit and suitably arrange these inside this integrated circuit.

The invention claimed is:

1. A signal processing device, comprising
a first integrated circuit generating a power source control signal for controlling an ON and OFF state of a power source,
a second integrated circuit, having a control register, turned on and off in power by the power source control signal generated by the first integrated circuit, and
an input/output buffer circuit arranged between the first integrated circuit and the second integrated circuit for performing input/output, wherein
the first integrated circuit controls the state of input or output of the input/output buffer circuit linked with the power source control signal, and
wherein the first integrated circuit fetches control content from the second integrated circuit and holds the control content inside the first integrated circuit before turning off the power source of the second integrated circuit by the power source control signal and transfers the held control content to the control register of second integrated circuit when switching the power source of the second integrated circuit on by the power source control signal.

2. A signal processing device, comprising
a first integrated circuit generating a power source control signal for controlling an ON and OFF state of a power source,
a second integrated circuit, having a storage circuit, turned on and off in power by the power source control signal generated by the first integrated circuit, and
an input/output butler circuit arranged between the first integrated circuit and the second integrated circuit for performing input/output, wherein
the first integrated circuit controls the state of input or output of the input/output buffer circuit linked with the power source control signal, and wherein the first integrated circuit fetches storage content from the storage circuit provided in the second integrated circuit and holds the storage content inside the first integrated circuit before turning off the power source of the second integrated circuit by the power source control signal and transfers the held storage content to the storage circuit of the second integrated circuit when switching the power source of the second integrated circuit on by the power source control signal.

3. A signal processing device as set forth in claim 2, wherein the first integrated circuit sets the output with respect to the input/output buffer circuit in a floating state linked with the power source control signal turning the power source of the second integrated circuit off.

4. A signal processing device as set forth in claim 2, wherein the first integrated circuit has a switch for fixing the input/output buffer circuit to either a pullup or pulldown mode linked with the power source control signal turning the power source of the second integrated circuit off when the input to the input/output buffer circuit is an undefined level.

5. A signal processing device as set forth in claim 2, wherein the first integrated circuit sets the output level of the input/output buffer circuit at a low level linked with the power source control signal turning the power source of the second integrated circuit off when the power source control signal is at a low level.

6. A signal processing device as set forth in claim 2, wherein the first integrated circuit switches the output of the input/output buffer circuit to input linked with the power source control signal turning the power source of the second integrated circuit off.

7. A mobile communication terminal device, comprising
a high frequency circuit part including a control register and
a control circuit part which is connected through an input/output buffer circuit to the high frequency circuit part and which performs control so as to suspend the supply of power to the high frequency circuit part in a reception suspension period when signaling information is not received in a standby state and to supply power to the high frequency circuit part at the time of the reception of signaling information, wherein
the control circuit part controls the input/output buffer circuit linked with the suspension of the supply of power, fetches a register value from the control register of the high frequency circuit part, holds the content of the control register set in the high frequency circuit part before suspending the supply of power to the high frequency circuit part, and transfers the held register value to the control register of the high frequency circuit part when restarting the supply of power to the high frequency part.

8. A communication system, comprising
a mobile communication terminal device and
a base station, wherein
the mobile communication terminal device includes
a high frequency circuit part including a control register and wirelessly communicating with the base station,
a control circuit part which is connected to the high frequency circuit part through an input/output butler circuit and performs controls so as to suspend the supply of power to the high frequency circuit part in a reception suspension period when signaling information is not received in a wireless communication standby state with the base station and to supply power to the high frequency circuit part at the time of reception of the signaling information, and
a control part,
the control part has a timer function of acquiring information concerning reception timing of following signaling information at the time of establishment of synchronization with the base station and measuring the reception timing,
the control circuit part has a power saving, mode of suspending operation or performing operation by a low frequency,
the control part sets the control circuit part to the power saving mode in the standby mode of the signaling information from the base station and releases the power saving mode when detecting by the timer function that the reception timing is approaching, and
the control circuit part controls the input/output buffer circuit linked with the suspension of the supply of power, fetches a register value from the control register of the high frequency circuit part, holds the control register content set in the high frequency circuit part before suspending the supply of power to the high frequency circuit part, and transfers the held register value to the control register of the high frequency circuit part when restarting the supply of power to the high frequency part.

* * * * *